US008641846B2

(12) United States Patent
Parsons et al.

(10) Patent No.: US 8,641,846 B2
(45) Date of Patent: Feb. 4, 2014

(54) METHOD FOR SEALING FENESTRATION OPENINGS

(75) Inventors: Gary D. Parsons, Midland, MI (US); Michael D. Bowe, Doylestown, PA (US); Janah C. Szewczyk, Philadelphia, PA (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 13/558,379

(22) Filed: Jul. 26, 2012

(65) Prior Publication Data

US 2013/0042961 A1 Feb. 21, 2013

Related U.S. Application Data

(60) Provisional application No. 61/524,346, filed on Aug. 17, 2011.

(51) Int. Cl.

| | |
|---|---|
| ***B60J 1/00*** | (2006.01) |
| ***E06B 3/00*** | (2006.01) |
| ***E06B 5/00*** | (2006.01) |
| ***E06B 7/00*** | (2006.01) |
| ***E04B 2/00*** | (2006.01) |
| ***E04F 13/00*** | (2006.01) |

(52) U.S. Cl.

USPC .................... 156/108; 156/71; 52/58; 52/249; 52/404.1; 52/741.1; 428/34; 428/41.8

(58) Field of Classification Search

USPC ............... 156/108, 71; 427/236; 52/309.3, 74

See application file for complete search history.

(56) References Cited

U.S. PATENT DOCUMENTS

| | | | | |
|---|---|---|---|---|
| 6,651,402 | B2 | 11/2003 | Grunst | |
| 2004/0040241 | A1 * | 3/2004 | Grunst | 52/309.11 |
| 2009/0145067 | A1 * | 6/2009 | Tatley et al. | 52/411 |
| 2009/0234072 | A1 * | 9/2009 | Nakagawa et al. | 525/100 |
| 2011/0034621 | A1 * | 2/2011 | Demarest et al. | 524/547 |

(Continued)

FOREIGN PATENT DOCUMENTS

| | | | | |
|---|---|---|---|---|
| WO | WO 2011/004753 | * | 1/2011 | C09D 133/06 |
| WO | 2012021590 | | 2/2012 | |
| WO | WO 2012/021590 | * | 2/2012 | E04B 1/76 |

OTHER PUBLICATIONS

JELD-WEN windows & doors Installation Instructions for Vinyl Windows with Integral Nailing Fin (JI001) [online]. Homedepot, 2008 [retrieved on May 29, 2013]. Retrieved from the Internet: <URL: http://www.homedepot.com/catalog/pdfImages/2e/2e4f51bd-190c-4420-b1f8-cb7ccf14a4ac.pdf>.*

(Continued)

*Primary Examiner* — Michael Orlando
*Assistant Examiner* — Marta Dulko
(74) *Attorney, Agent, or Firm* — Steven W. Mork

(57) ABSTRACT

Seal a fenestration opening that contains a gap having a width of greater than 1.6 millimeters by providing a dispersion having the following components dispersed in an aqueous phase: (i) a film-forming polymer binder having a glass transition temperature in a range of −100 degrees Celsius to −20 degrees Celsius; (ii) a shear thinning rheology modifier at a concentration sufficient to cause the dispersion to have a Brookfield viscosity greater than 300,000 centiPoise as measured using spindle #3 at 0.3 revolutions per minute; and (iii) optionally, a filler; and then spraying the dispersion directly onto the building elements within the fenestration opening so as to form a continuous coating over the building elements and gap within the fenestration opening; wherein there is an absence of reinforcement or sealing material filling or spanning the gap prior to spraying the dispersion over the gap.

7 Claims, 3 Drawing Sheets

(56) References Cited

U.S. PATENT DOCUMENTS

| | | | | |
|---|---|---|---|---|
| 2011/0151225 | A1* | 6/2011 | Bowe et al. | 428/220 |
| 2012/0094115 | A1* | 4/2012 | Takeda et al. | 428/339 |

OTHER PUBLICATIONS

Protecto LWM200 Liquid Waterproofing Membrane.
Dribond Liquid Flash.
Dribond Liquid Flash II.
Specseal AS200 Elastomeric Spray.
R-Guard Spray Wrap (http://www.prosoco.com/Products/2dc4232b-68a5-483f-bfb0-162ccb357aff).
Air-Bloc 31 (www.globalplasticsheeting.com/air-bloc-31).
STO-Guard Spray on Building Wrap.

* cited by examiner

METHOD FOR SEALING FENESTRATION OPENINGS

BACKGROUND OF THE INVENTION

1. Field of the Invention

The present invention relates to a method for sealing fenestration openings in buildings using a spray-on coating.

2. Description of Related Art

Fenestration openings in buildings are a particularly challenging portion of a structure to seal from water penetration. Sealing fenestration openings generally requires sealing gaps and cracks at joints between building elements (for example, where one framing element buts up against another framing element) as well as sealing over the entire framework prior to inserting a window or door into the opening. Complete protection of the fenestration opening further requires application of flashing materials over the seam between the window or door and the building frame around the fenestration opening in which the window or door resides and sealing of that flashing material with the building frame. Proper sealing of a fenestration opening can be a time consuming process that adds significant cost to constructing a building.

The process of sealing fenestration openings has become easier with the innovation of liquid waterproofing membrane materials and liquid flashing materials. Liquid waterproofing membrane materials offer convenience of efficiently and completely coating and sealing a surface with a material that adheres to a surface to seal that surface. Unlike conventional sheet-type house-wrap materials, liquid waterproofing membranes will not blow off in the wind or allow moisture to penetrate between the house-wrap sheet and building frame during construction. Moreover, a single person can easily apply liquid waterproofing membranes to a structure. Peel and stick adhesive-backed flashing is also an option for sealing a fenestration opening before, after, or both before and after inserting a window or door into the opening. Peel and stick products offer improvements in handling over sheet-type house-wrap materials, but still require undesirable amounts of time to cut the product to size, peel off and dispose of the backing sheet followed by positioning and applying the product to the building structure.

Commercially available liquid waterproofing membranes include Protecto LWM200™ from Protecto Wrap Company, StoGuard™ brand waterproofing/air barrier assembly from Sto Corporation and Dribond Liquid Flash water proofing membrane. While these liquid waterproofing membranes offer an advantage over conventional sheet-type house-wrap materials and peel and stick flashing products, they still leave room for improvement.

Dribond Liquid Flash is a liquid sealant material that is designed to be brushed onto a surface to form a resilient waterproof flashing membrane. Brushing a liquid membrane onto a building frame is easier than applying sheet-type house-wrap or a peel and stick flashing product and provides more intimate adhesion and a better seal between the membrane and frame. However, it is desirable to have a sprayable liquid sealing material to make application even more efficient, as well as more uniform, than brushing. However, achieving a sprayable liquid sealing material that has the sealing and coating properties of a more viscous brushable membrane material is challenging to achieve since sealing properties are enhanced by higher viscosity and sprayability by lower viscosity. Hence, to achieve suitable sealing properties most liquid membrane materials are only available in brushable form, or must be combined with additional sealing materials.

Protecto LWM200 is another liquid sealant material specifically for window and door openings. While advertising literature indicates that a spray applied version of LWM200 Liquid Waterproofing Membrane is available upon request, yet the present inventors have been unable to obtain any sprayable version despite making such a request from the manufacturer. According to its literature LWM200 Liquid Waterproofing Membrane is limited in its ability to span gaps and cracks to gaps and cracks up to $1/16^{th}$ of an inch (1.6 millimeters). Larger gaps and cracks require first application of a separate sealant or patch material to fill or cover the gap/crack followed by subsequent application of the liquid sealant material. Therefore, even if a spray version of Protecto LWM200 were available it would be a desirable improvement to have a sprayable membrane that could span gaps and cracks greater than $1/16^{th}$ inch without requiring additional sealants or patches. Spanning a gap or crack greater than $1/16^{th}$ inch requires a relatively high viscosity material, which makes spraying the material a greater challenge. Hence, obtaining sprayability with an ability to span gaps greater than $1/16^{th}$ of an inch is a particular challenge.

StoGuard also comprises a sprayable liquid membrane material but specifically requires additional protection for joints in the surfaces being coated. In particular, installation instructions for StoGuard instruct applying mesh to vertical and horizontal sheathing joints prior to applying any sprayable coatings. Moreover, the installation instructions specify applying two more coatings after the mesh: spraying or trowling Sto Gold Fill™ over the mesh and fasteners and then, after that dries, application of Sto Gold Coat™ over the wall surface. Instructions for window and door openings also specify application of mesh to joints and seams in rough opening frames followed by application of both Sto Gold Fill and Sto Gold Coat to complete the protective coating. Additional mesh, Sto Gold Fill and Sto Gold Coat are all needed to flash a window once installed in the opening Applying additional materials to seams and joints takes time and therefore increases construction costs. The cost of applying additional materials is particularly challenging for recessed windows and/or windows having complex shapes. Recessed windows tend to have deep fenestration openings with large surface areas in the building framework defining the fenestration opening. Complex shaped fenestration openings, such as arched openings or even more complex shapes, can comprise a multitude of joints and seams in the building frame defining the fenestration opening. Increasing the surface areas and increasing the number of seams and joints in the framework within a fenestration opening increases the amount of labor needed to apply sealing materials and, hence increases the cost of constructing the building. Therefore, it is desirable to reduce the number of different sealing materials needed to seal a fenestration opening. It is also desirable to have a spray on sealing material to increase the speed at which the material can be applied relative to painted, troweled or gunned (that is, application by a caulk gun) materials.

It is desirable to be able to spray apply sealing materials to seal fenestration openings, including gaps and cracks greater than $1/16^{th}$ inch, without requiring additional sealing materials. It is further desirable to be able to spray apply a sealing material to flash windows that have been inserted into a fenestration opening without first having to apply additional flashing material, or preferably, any additional flashing material before or after applying the sprayable waterproofing membrane material.

BRIEF SUMMARY OF THE INVENTION

The present invention offers a method for sealing a fenestration opening that comprises a gap or crack that exceeds 1.6 millimeters ($\frac{1}{16}^{th}$ inch) and that can be 3.2 millimeters ($\frac{1}{8}^{th}$ inch) or more, 6.4 millimeters (¼ inch) or more, even 12.7 millimeters (½ inch) or more by spraying a sealing material that spans the gap or crack and forms a watertight coating without requiring any additional sealant material. The present invention further offers a method for flashing a window set in the fenestration opening by spraying a waterproofing material over the joint between the window and the building frame in which the window resides first applying any additional flashing material. One of the challenges the present invention had to overcome to provide this solution is identification of a spray on composition that had sufficiently low viscosity to allow it to be spray applied while having high enough viscosity once applied to span large (for example, greater than 1.6 millimeters) gaps and not to run when applied to vertical surfaces.

In a first aspect, the present invention is a method for sealing a fenestration opening, the method comprising: (a) providing a building frame comprising building elements that define a fenestration opening, wherein the building elements define a gap having a width greater than 1.6 millimeters and equal to or less than 6.35 millimeters within the fenestration opening; (b) providing a dispersion comprising the following dispersed in a continuous aqueous phase: (i) a film-forming polymer binder having a glass transition temperature in a range of −100 degrees Celsius to −20 degrees Celsius; (ii) a shear thinning rheology modifier at a concentration sufficient to cause the dispersion to have a Brookfield viscosity greater than 300,000 centiPoise as measured using spindle #3 at 0.3 revolutions per minute; and (iii) optionally, a filler; (c) spraying the dispersion directly onto the building elements within the fenestration opening so as to form a continuous coating over the building elements and gap within the fenestration opening; wherein there is an absence of reinforcement or sealing material filling or spanning the gap prior to spraying the dispersion over the gap.

The present invention is useful for efficiently sealing fenestration openings in buildings.

DETAILED DESCRIPTION OF THE INVENTION

Figure 1:
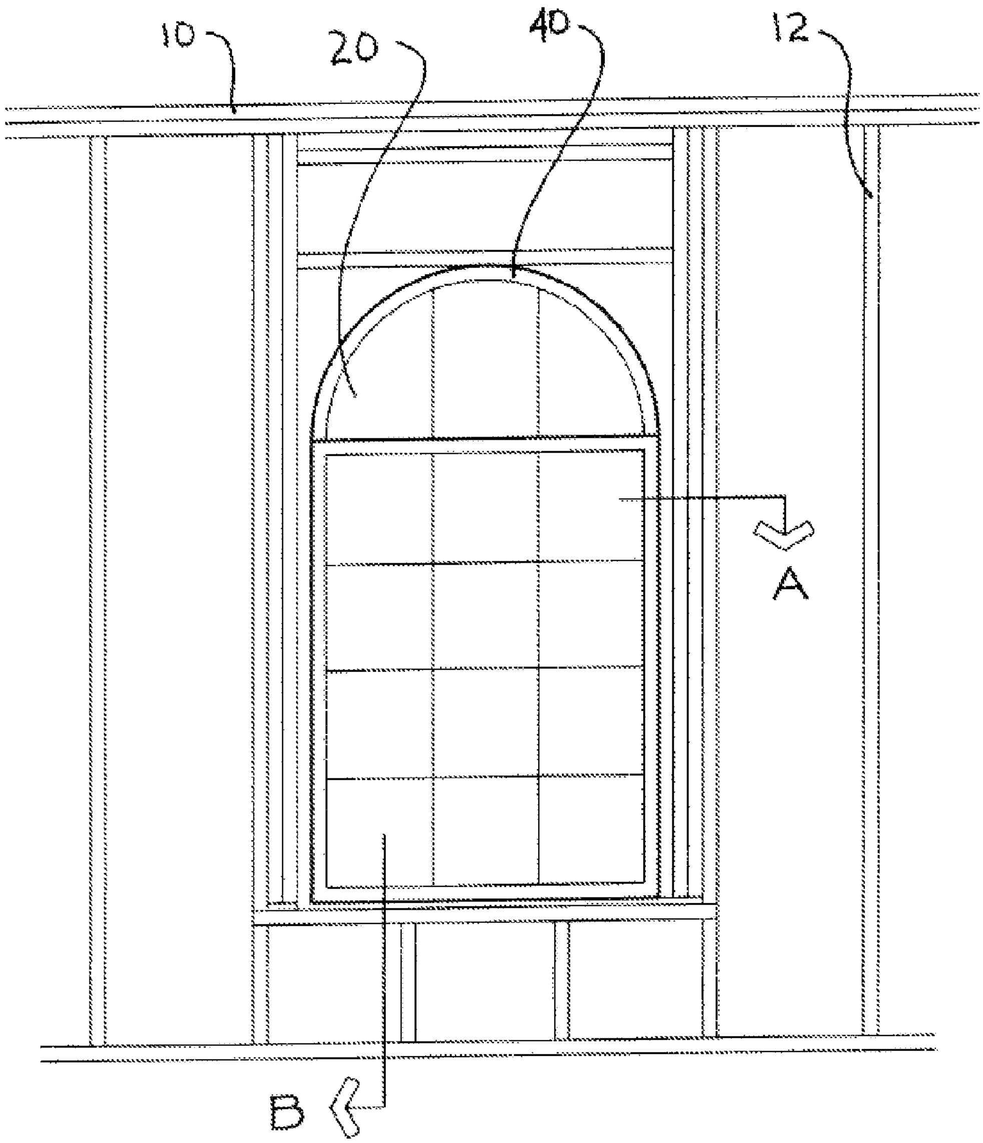
FIG. 1 illustrates an elevation view of a building frame comprising defining a fenestration opening that contains a window.

Test methods refer to the most recent test method as of the priority date of this document when a date is not indicated with the test method number. References to test methods contain both a reference to the testing society and the test method number. The following test method abbreviations and identifies apply herein: ASTM refers to American Society for Testing and Materials; EN refers to European Norm; DIN refers to Deutches Institute fur Normung; and ISO refers to International Organization for Standards.

"Multiple" means two or more. "And/or" means "and, or as an alternative". All ranges include endpoints unless otherwise indicated.

The method of the present invention is for use on a building frame comprising building elements that define a fenestration opening. As such, the method comprises first providing such a structure. The method is most useful for light-framed construction where the building elements include studs, headers and optionally sheathing material. Common building elements include lumber and metal and are often in the form of "two-by" dimensions, for example two-by-four (2×4), two-by-six (2×6), and two-by-eight (2×8). Such dimensions refer to a nominal thickness and width of the element in inches. Conventionally, the "two-by" number refers to the actual thickness in inches plus ½-inch and the second number refers to the actual width of the element in inches plus ½-inch. Building elements can also include sheathing material, typically serving as the outside surface of the building frame and commonly attached over stick frame elements such as "two-by" lumber. Sheathing material includes materials such as oriented strand board (OSB), plywood, and insulation sheathing.

The building elements are assembled into a building frame. A building frame defines the inside of a building (inside of the building frame) from the outside of the building (outside of the building frame). Generally, the building frame defines a framework that encloses the inside of the building. The portion of the building frame facing the inside of the building is the inside surface of the building frame. The opposing surface of the building frame is the outside surface of the building frame. Within the building frame the elements define a fenestration opening. Typically, the elements define multiple fenestration openings in the building frame.

A fenestration opening is an opening for a window, door or other portal through the building structure that connects the outside of the structure to the inside of the structure. Typically, the fenestration opening is designed to contain something that closes the opening while providing access between the inside and outside of the building frame visually (for example, a window provide visible access between the inside and outside of the building frame) and desirably also physically (for example, a door or openable window can be opened to allow physical passage between the inside and outsides of a building frame).

In constructing a building frame it is common to have gaps between building elements. Particularly when using lumber building elements, the building elements have dimensional variations in the form of twists, warps, bows. As a result, it can be difficult to assemble a building frame that has building elements fitting together so closely as to preclude any gaps or voids between them. Gaps between building elements can be problematic in locations such as fenestration openings because there is a risk that water and/or air can penetrate the building framework through the gap. In fenestration openings, it is particularly desirable and necessary to seal the gaps to water as well as air. Builders typically take time to seal gaps and entire frame elements in fenestration openings to ensure air and moisture does not leak into the framework through any gaps in those areas. However, it can be a time and material intensive process to seal the framework of a fenestration opening, particularly when there are large gaps to seal.

The building frame of the present invention has building elements that fit together in such a way as to define at least one gap within a fenestration opening that is greater than 1.6 millimeters in width. The gap within the fenestration opening can be 3.2 millimeters (0.125 inches) or more, 6.4 millimeters (0.25 inches) or more and even 12.7 millimeters (0.5 inches) or more in width. The upper limit of gap capable of being sealed by the present invention has not been discovered. However, the gap is generally 25.4 millimeters (one inch) or less, preferably 19.1 millimeters (0.75 inch) or less in width. These are relatively large gaps yet they are common in the building industry. Such gaps typically require either filling or covering with a support means (for example, mesh) before sealing. Yet, the method of the present invention provides a quick and simple way to seal those gaps, and the entire framework within a fenestration opening, to both water and air using a spray-on coating without first having to apply a reinforcement or sealing material to fill or span the gap such as by filling the gap with a caulk or filler of any kind or spanning the gap with a support means such as a mesh or tape.

Sealing a fenestration opening according to the present invention requires providing a dispersion comprising materials in a continuous aqueous phase. The dispersion serves as a spray-on formulation for coating the building elements of a fenestration opening in a building frame. Surprisingly, the dispersion has sufficient sag strength and viscosity to span and seal a gap having a width greater than 1.6 millimeters (mm), preferably 3.2 mm or more, still more preferably 6.4 millimeters or more, and yet more preferably 12.7 mm or more while also have sufficiently low viscosity under shear to allow it to be sprayed on to the building elements of a building frame.

The dispersion is a film-forming dispersion of polymer binder. “Film forming” means that upon removal of the aqueous continuous phase the remaining dispersed polymer binder phase forms a continuous polymer film. The polymer binder is typically non-crosslinked to facilitate film formation upon drying of the dispersion. However, some crosslinking can be present provided the dispersion forms a film upon drying. How much crosslinking is allowable is an empirical determination for a giving polymer system. Characterizations such as a minimum film formation temperature (MFFT) determination can be done to determine whether a dispersion is film forming. Suitable test methods for determining MFFT include ASTM D2354-10. Desirably, the dispersion has a MFFT of 20° C. or lower, preferably at 10° C. or lower, still more preferably two (2) ° C. or lower. It is desirable for the dispersion to be applied at a temperature above the glass transition temperature of the polymer binder to facilitate film formation upon drying. Generally, the glass transition temperature (Tg) of the polymer binder is −100 degrees Celsius (° C.) or higher and at the same time 25° C. or lower, preferably 20° C. or lower, still more preferably 10° C. or lower, even more preferably 0° C. or lower, and yet more preferably −10° C. or lower and can be −20° C. or lower, even −30° C. or lower. Determine Tg for a polymer binder according to ASTM E-1356-08.

The polymer composition of the binder is not limited in the broadest scope of the present invention. Desirably, the polymer binder is selected from a group consisting of styrene-butadiene copolymer, ethylene-vinyl acetate copolymer, ethylene-vinyl versatate copolymer, styrene-acrylic copolymer or an acrylic copolymer. Acrylic copolymers are particularly desirable as polymer binder because they have long ultraviolet durability which will help retain film properties if left exposed to the sun for long periods of time during building construction.

The dispersion also contains a shear thinning rheology modifier. A rheology modifier is useful for adjusting the viscosity of the dispersion. By being shear thinning, the rheology modifier can produce a dispersion having higher static viscosity than viscosity under shear (such as when spraying). Shear thinning properties are desirable to achieve anti-sag properties for the coating when sprayed on a vertical, or even horizontal, surface due to relatively high static viscosity while still being sprayable due to lower relative viscosity under shear. Suitable shear thinning rheology modifiers include hydrophobically modified alkali soluble emulsion (HASE) such as Acrysol™ TT-615 (Acrysol is a trademark of Rohm and Haas Company), hydrophobically modified ethylene oxide urethane (HEUR) such as Acrysol™ RM 12-W, as well as modified clays and inorganic materials such as rockwool and attapulgite clay.

The concentration of shear thinning rheology modifier is sufficient to provide high enough static viscosity to prevent excessive sag of the coating on vertical surfaces and to enable enough coating integrity to span a gap while at the same time having sufficient viscosity under shear to be sprayable. To achieve sufficient static viscosity the dispersion should have a viscosity of at least 300,000 centiPoise (cP), preferably 450,000 cP and more preferably 500,000 cP or more when measured with a Brookfield viscometer using spindle #3 at 0.3 revolutions per minute. At the same time, the dispersion should demonstrate sufficiently low viscosity under high shear to be sprayable from a commonly available sprayer (for example, the dispersion should be sprayable from a Graco Tex Spray Mark-IV airless sprayer at 17 mega Pascals (2500 pounds per square inch) using a Graco 521 spray tip). Determination of the appropriate concentration of rheology modifier is best left as an empirical determination. However, typically, the concentration of shear thinning rheology modifier is in a range of 0.1 to 1.0 wt % relative to total dispersion weight.

The dispersion can, and typically does, further comprise filler. Suitable fillers include, for example, alkaline earth metal sulfates or carbonates, (for example, barites, calcium carbonate, calcite and magnesium carbonate); silicates (for example, calcium silicates, magnesium silicates and talc); metal oxides and hydroxides (for example, titanium dioxide, alumina and iron oxides); diatomaceous earth; colloidal silica; fumed silica; carbon black; white carbon black; nutshell flour; natural and synthetic fibers (for example, plaster fibers); and scrap or recycled plastics in the form of dust, flakes or flour; hollow or solid ceramic, glass or polymeric microspheres. When filler is present, the weight ratio of pigment to binder is 0.25 or higher, preferably 0.5 or higher, more preferably 1.0 or higher and can be 1.1 or higher while at the same time is generally 2.5 or less, preferably 2.25 or less, still more preferably 2.0 or less. If the ratio of pigment to binder exceeds 2.5 the resulting film tends to lack flexibility.

One particularly desirably dispersion comprises a polymer binder selected from: (a) a mixed backbone acid copolymer containing methacrylic acid and at least one second acid monomer having a lower pKa than methacrylic acid and selected from a group consisting of monocarboxylic acids, dicarboxylic acids, phosphorous acids, and sulfur acids with the concentration of methacrylic acid and the second acid monomer copolymerized in the copolymer at a concentration of 0.1 to 5.0 weight-percent based on total copolymer weight; and (b) a copolymer polymerized from a combination of acid-containing monomer and hydroxyl containing monomers, wherein the concentration of acid containing monomers is from 0.5 to 7.5 weight-percent of the total weight of copolymerized monomers and the concentration of hydroxyl containing monomers is 1.0 to 5.0 weight-percent of the total weight of copolymerized monomers, where at least one acid containing monomer is selected from a group consisting of methacrylic acid and the group of second acid monomers; and the dispersion further comprises at least one filler at a concentration in a range of 25 to 250 weight-percent based on total polymer weight.

The method comprises spraying the dispersion directly onto the building elements within the fenestration opening so as to form a continuous coating over the building elements and gap within the fenestration opening. It is desirable to apply the dispersion onto the building elements to an average wet thickness within the fenestration opening of at least one millimeter and can be 1.5 mm or more and is generally 2.5 mm or less. Wet thicknesses of at least one mm are desirable to ensure continuous coverage over gaps in the elements. Coatings thicker than 2.5 mm tend to undesirably crack upon drying.

The wet coating should be a continuous coating over the building elements within the fenestration opening. The coating is intended to dry to form a barrier coating over the building elements and gap, or gaps, between the building elements. Therefore, the coating is applied as a continuous coating to seal the building elements and gaps in the fenestration opening. The coating entirely covers the building elements and gaps within the fenestration opening. When the coating dries, it desirably remains continuous and desirably remains entirely covering the building elements and gap, or gaps, within the fenestration opening. Typically, drying of the coating occurs by natural evaporation of the aqueous phase but drying can include application of heat or other means to accelerate the drying process. The portion of the fenestration opening that is "within the fenestration opening" resides between the inside and outside surfaces of the building frame. It is common for the coating to extend beyond the fenestration opening and further coat at least a portion of the elements on the outside of the building frame, the inside of the building frame, or both the outside and inside of the building frame.

The resulting coating formed by drying the dispersion is desirably flexible at temperatures down to at least 0° C., preferably −10° C. or lower, more preferably −20° C. or lower, still more preferably −30° C. or lower, and yet more preferably −50° C. or lower. To achieve flexibility at a specified temperature the polymer binder forming the film desirably, but not necessarily, has a Tg at or below that specified temperature. To determine whether a dispersion produces a coating that is flexible at a certain temperature prepare a one millimeter thick wet coating of the dispersion, dry it to form a dry coating (film) and attempt to wrap the film around a 12 mm diameter mandrel at the certain temperature. If the film can be wrapped around the mandrel (or a smaller diameter mandrel) without cracking within one minute then the film is "flexible". Flexible films are desirable to accommodate dimensional changes through, for example, thermal expansion and contraction of structural members after coating with the dispersion to seal them. To achieve a flexible film the dispersion should have a pigment volume concentration (PVC) of less than 60%, preferably less than 50% and more preferably less than 45%. Additionally, it is desirable for the polymer binder to have a Tg below the temperature at which the dispersion is being applied so that it will form a film upon drying.

The method of the present invention can further include installation of a window into the fenestration opening. Typically, framing elements that define fenestration openings for windows further define a framework around the circumference of the fenestration opening that resides inside or outside the fenestration opening. If the framework resides outside the fenestration opening, the frame is typically the outside surface of the building frame. If the framework resides inside the fenestration opening the frame typically is a building element extending into the fenestration opening to form a lip around the inside circumference of the fenestration opening. A window commonly has incorporated with it an attachment flange around its perimeter that fits flush against the framework extending around the circumference of the fenestration opening when the window is installed. Mechanical fasteners such as nails or screws can be driven through the attachment flange into the framework to hold the window in place within the fenestration opening.

It is desirable, though not required, to dispose a sealant between the attachment flange of a window and the framework against which the attachment flange fits, preferably as a continuous bead of sealant around the window. Such a sealant can help seal the window frame from air and moisture penetration through the fenestration opening. Suitable sealants include acrylic latex, silicon and polyurethane sealants.

Regardless of whether a sealant resides between the attachment flange and framework, it is desirable to spray a coating of the dispersion over the attachment flange and adjoining framing elements so as to form a continuous coating around the window that, upon drying, forms a seal over the interface between the attachment flange and the building frame. It can be advantageous only to spray a coating of the dispersion over the attachment flange and adjoining framing elements at the top (head) and sides (jambs) of the window while leaving the bottom (sill) flange uncoated so that if any water becomes present behind the window flanges the water can drain out from beneath the sill flange. The coating and resulting seal further desirably extends over any mechanical fasteners that extend through the attachment flange and into the framework of the building frame.

The present method has particular value with fenestration openings in the form of recessed window openings. A recessed window opening is a special form of fenestration opening for a window and is characterized by a framework against which the mounting flange of a window fits is within the fenestration opening. Typically, a recessed window opening has a depth (dimension between inside and outside of the building frame) that is greater than the depth of the window such that when installed the window resides entirely within the fenestration opening. Usually, a window installed within a recessed window fenestration opening occupies less than the entire fenestration opening and leaves building elements exposed within the fenestration opening even after installation. Recessed window openings are particularly challenging to seal from water and air penetration. Water can be a particular challenging because the opening can collect rain water and snow. Recessed window openings have greater surface area than regular window openings that present greater sealing demands. The method of the present invention can be used to seal recessed window fenestration openings just as easily as any other fenestration opening by spraying the dispersion over the building elements defining the opening to form a continuous coating over the building elements and any gaps between them. Such a method is much faster and less labor intensive than trying to seal the opening with peel and stick products or sheet materials. Moreover, such a method allows ready application and conformation of the sealant to complex shapes often found with recessed windows.

Example

Provide a building frame that defines a recessed window opening. The building frame comprises building elements that define at least one gap of 1.6 millimeters between them in the recessed window opening.

Provide a dispersion comprising the following components:

| Component | Description | Weight-Percent of Dispersion |
|---|---|---|
| Polymer Binder with Tg onset of −43° C. | Copolymer of: 95 wt % butyl acrylate 2 wt % methyl methacrylate 1.5 wt % acrylic acid 0.5 wt % methacrylic acid with 0.05 wt % n-dodecyl mercaptan as a chain transfer agent. | 56.85 |
| Defoamer | Nopco NXZ CAS No. 12794-56-8 | 0.3 |
| Pigment | Calcium carbonate (Snowwhite 12) | 37 |
| Pigment | Titanium dioxide (Ti-Pure R-706) | 1.4 |
| Pigment | Zinc Oxide (Kadox 915) | 0.75 |
| Dispersant | Polyacrylic acid with weight-average molecular weight of 13000 (Tamol 851) | 1.5 |
| | Propylene glycol | 2 |
| Shear thinning rheology modifier | Hydroxyl ethyl cellulose (Cellosize QP-100MH) | 0.2 |
| Continuous phase | Water | Balance to 100 |

Prepare two kilograms of the dispersion by adding sequentially into a container the latex binder, the defoamer, the titanium dioxide and the zinc oxide and subjecting to a Cowles disperser operating at 2000 revolutions per minute. Mix for ten minutes and then transfer to a Hobart mixer capable of being operated under vacuum. Prepare a pre-mix of the propylene glycol with the hydroxyl ethyl cellulose in a beaker using a stirring stick to stir. Add this to the dispersion in the Hobart mixer along with 0.2 weight-parts based on 100 weight-parts dispersion weight of 28% ammonia solution. Mix with the Hobart mixer using a flat "B" style beater for ten minutes or until the content of the mixer are uniformly thickened. Add the calcium carbonate and mix an additional ten minutes and then mix for yet another ten minutes while drawing a vacuum to 25 millimeters mercury on the blender and its contents.

The resulting dispersion has a solids content of 75.4 wt %, pH of 9.2, a wet density of 1.38 grams per milliliter and a viscosity profile using a Brookfield RV-LV device with spindle #3 as follows:

| Spindle Speed (revolutions per minute) | Viscosity (centipoises) |
|---|---|
| 0.3 | 503,000 |
| 0.6 | 279,000 |
| 1.5 | 138,000 |
| 3 | 81,100 |
| 6 | 48,400 |
| 12 | 28,900 |
| 30 | 14,900 |
| 60 | 9,320 |

This viscosity profile illustrates the shear thinning character of the dispersion by having lower viscosity at high spindle speeds.

Using a Graco Tex Spray Mark-IV airless sprayer at 17 mega Pascals (2500 pounds per square inch) pressure spray a coating having an average thickness of one millimeters over the building frame elements defining the recessed window opening and the gap or gaps between building elements of the building frame within the recessed window opening. Allow the coating to dry resulting in a monolithic flexible membrane (film, coating) on the building elements defining the window opening that spans the gaps without requiring filler or reinforcement materials in or over the gaps. The resulting monolithic flexible membrane forms a watertight coating over the gaps without first covering or filling the gaps with another material.

Notably, the capability to span even larger cracks is evident in further examples by spraying in like manner a similar coating over building frame elements defining gaps of 3.2 mm, 6.4 mm and even 12.7 mm defined. The coating dries to from a monolithic flexible membrane that forms a watertight coating even over the gaps of 3.2 mm, 6.4 mm and 12.7 mm without first filling the gap with another material or spanning the gap with another material.

Apply a bead of silicone sealant to the back of the window attachment flange (the surface that will contact a framework building frame) and insert into the window into the window opening so that the attachment flange abuts a framework of the building frame within the window opening such that the monolithic flexible membrane resides between the attachment flange and the framework. In like manner as already described for spraying a coating of the dispersion, spray another coating of dispersion over the attachment flange and onto the monolithic flexible membrane all around the perimeter of the window and allow the coating to dry to a monolithic flexible membrane that forms a seal around the attachment flange.

FIG. 1 illustrates an elevation view of building frame 10 comprising studs 12 and defining fenestration opening 20 with window 40 in fenestration opening 20.

Figure 2:
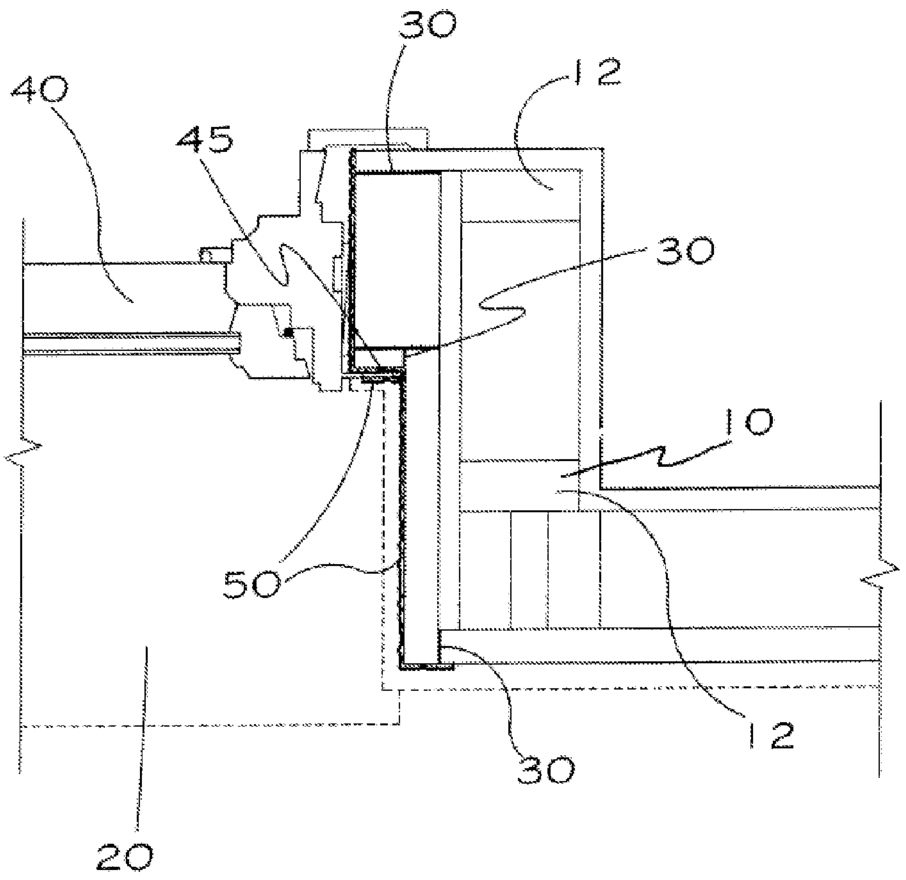
FIGS. 2 and 3 illustrate cut-away views of the building frame and window of FIG. 1.
Figure 3:
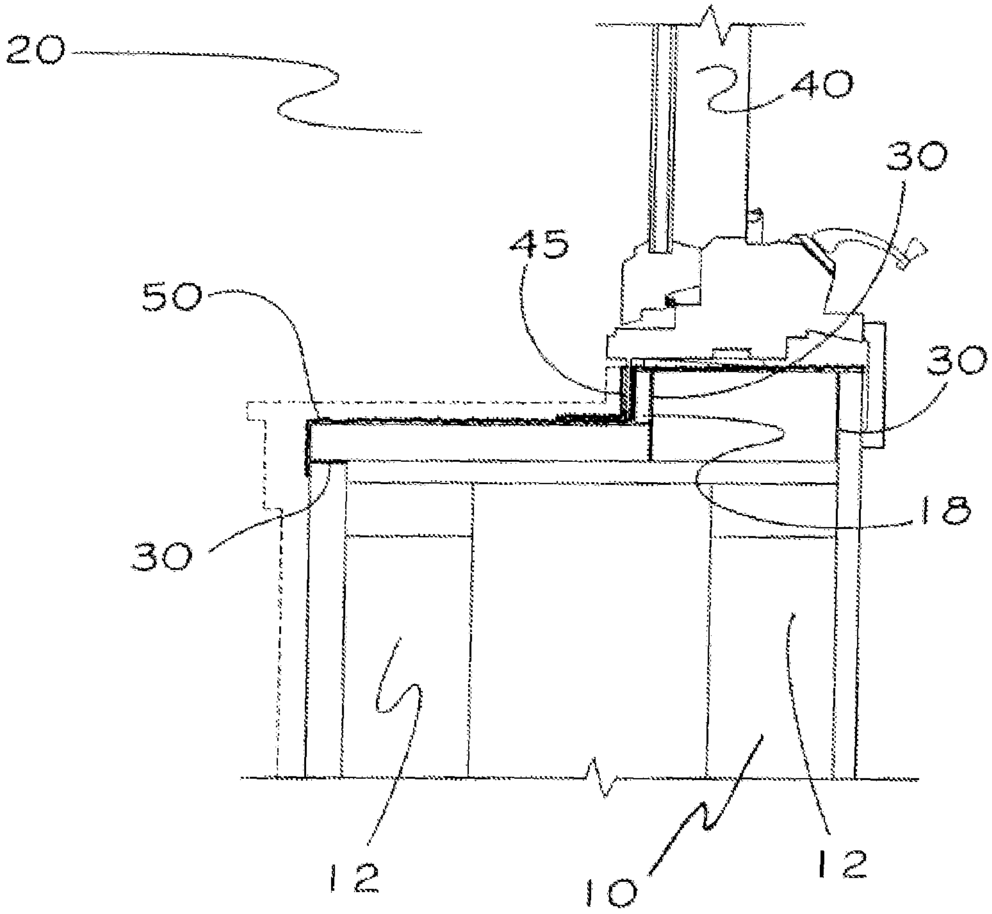

FIGS. 2 and 3 are cut-away views along viewing lines A and B respectively as showing in FIG. 1. FIG. 2 is a view looking down and FIG. 3 is a view sideways. The figures illustrate building frame 10 that defines fenestration opening 20, a recessed window opening. The building frame contains building elements such as studs 12. The building elements define gaps 30 that are 1.6 millimeters wide between them at various locations. The figures further illustrate window 40 installed in fenestration opening 20 with attachment flange 45 seated against framework 18 with monolithic flexible membrane 50 resulting from spraying the dispersion onto the building frame between flange 45 and framework 18 as well as over flange 45.

What is claimed is:

1. A method for sealing a fenestration opening, the method comprising:

(a) providing a building frame comprising building elements that define a fenestration opening, wherein the building elements define a gap having a width greater than 1.6 millimeters within the fenestration opening;

(b) providing a dispersion comprising the following dispersed in a continuous aqueous phase:

(i) a film-forming polymer binder having a glass transition temperature in a range of −100 degrees Celsius to −20 degrees Celsius;

(ii) a shear thinning rheology modifier at a concentration sufficient to cause the dispersion to have a Brookfield viscosity greater than 300,000 centiPoise as measured using spindle #3 at 0.3 revolutions per minute; and (iii) optionally, a filler;

(c) spraying the dispersion directly onto the building elements within the fenestration opening so as to form a continuous coating over the building elements and gap within the fenestration opening;

wherein there is an absence of reinforcement or sealing material filling or spanning the gap prior to spraying the dispersion over the gap, the method further comprising the following steps: (d) providing a window having an attachment flange on its perimeter; (e) inserting the window into the fenestration opening, wherein the building elements of the building frame define a framework around the circumference of the fenestration opening that resides inside or outside the fenestration opening and against which the attachment flange of the window fits against upon inserting the window into the fenestration opening; and (f) spraying the dispersion over the attachment flange and adjoining framing elements so as to forma continuous coating around the window that upon drying forms a seal over the interface between the attachment flange and the building frame; where step (d) occurs at any time prior to steps (e) and (f) and steps (e) and (f) occur after step (c).

2. The method of claim 1, further characterized by spraying the dispersion to an average wet thickness within the fenestration opening of at least one millimeter.

3. The method of claim 1, further characterized by the fenestration opening being a recessed window opening.

4. The method of claim 1, further characterized by the film forming polymer binder being selected from: (i) a mixed backbone acid copolymer containing methacrylic acid and at least one second acid monomer having a lower pKa than methacrylic acid selected from a group consisting of monocarboxylic acids, dicarboxylic acids, phosphorous acids, sulfur acids with the concentration of methacrylic acid and second acid monomer copolymerized in the copolymer at a concentration of 0.1 to 5.0 weight-percent based on total copolymer weight; and (ii) a copolymer polymerized from a combination of acid-containing monomer and hydroxyl containing monomers, wherein the concentration of acid containing monomers is from 0.5 to 7.5 weight-percent of the total weight of copolymerized monomers and the concentration of hydroxyl containing monomers is 1.0 to 5.0 weight-percent of the total weight of copolymerize monomers, where at least one acid containing monomer is selected from a group consisting of methacrylic acid and the group of second acid monomers; wherein the dispersion further comprises at least one filler at a concentration in a range of 25 weight-percent to 250 weight-percent based on total polymer weight.

5. The method of claim 1, further comprising a step of disposing a sealant onto the attachment flange, the framework against which the attachment flange fits, or both so that upon inserting the window into the fenestration opening the sealant resides between the attachment flange and the framework that the attachment flange fits against.

6. The method of claim 1, wherein the building elements define a gap having a width greater than 3.2 millimeters.

7. The method of claim 1, wherein the building elements define a gap having a width of 6.4 millimeters or more.

* * * * *